No. 645,144. Patented Mar. 13, 1900.
T. TOLSON.
VELOCIPEDE.
(Application filed Feb. 15, 1899.)
(No Model.) 4 Sheets—Sheet 1.
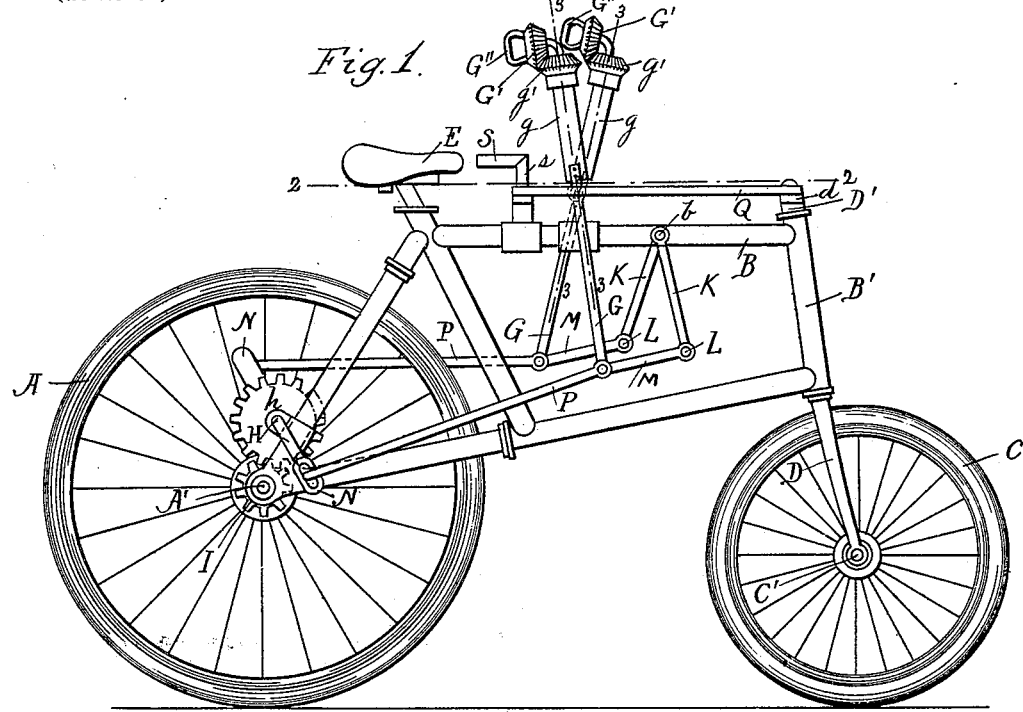
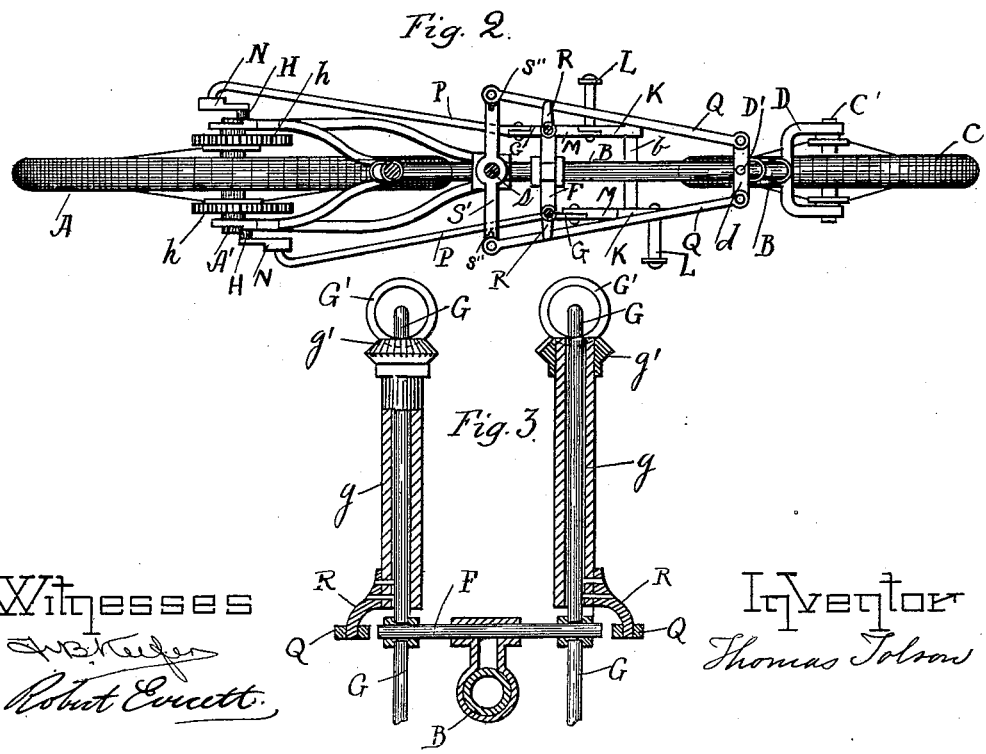
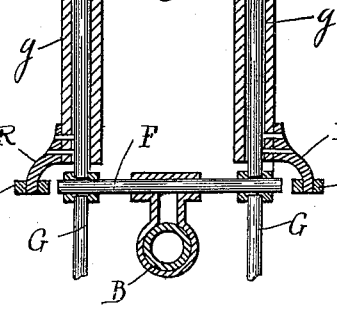
Witnesses
Inventor
Thomas Tolson No. 645,144. Patented Mar. 13, 1900.
T. TOLSON.
VELOCIPEDE.
(Application filed Feb. 15, 1899.)
(No Model.) 4 Sheets—Sheet 2.
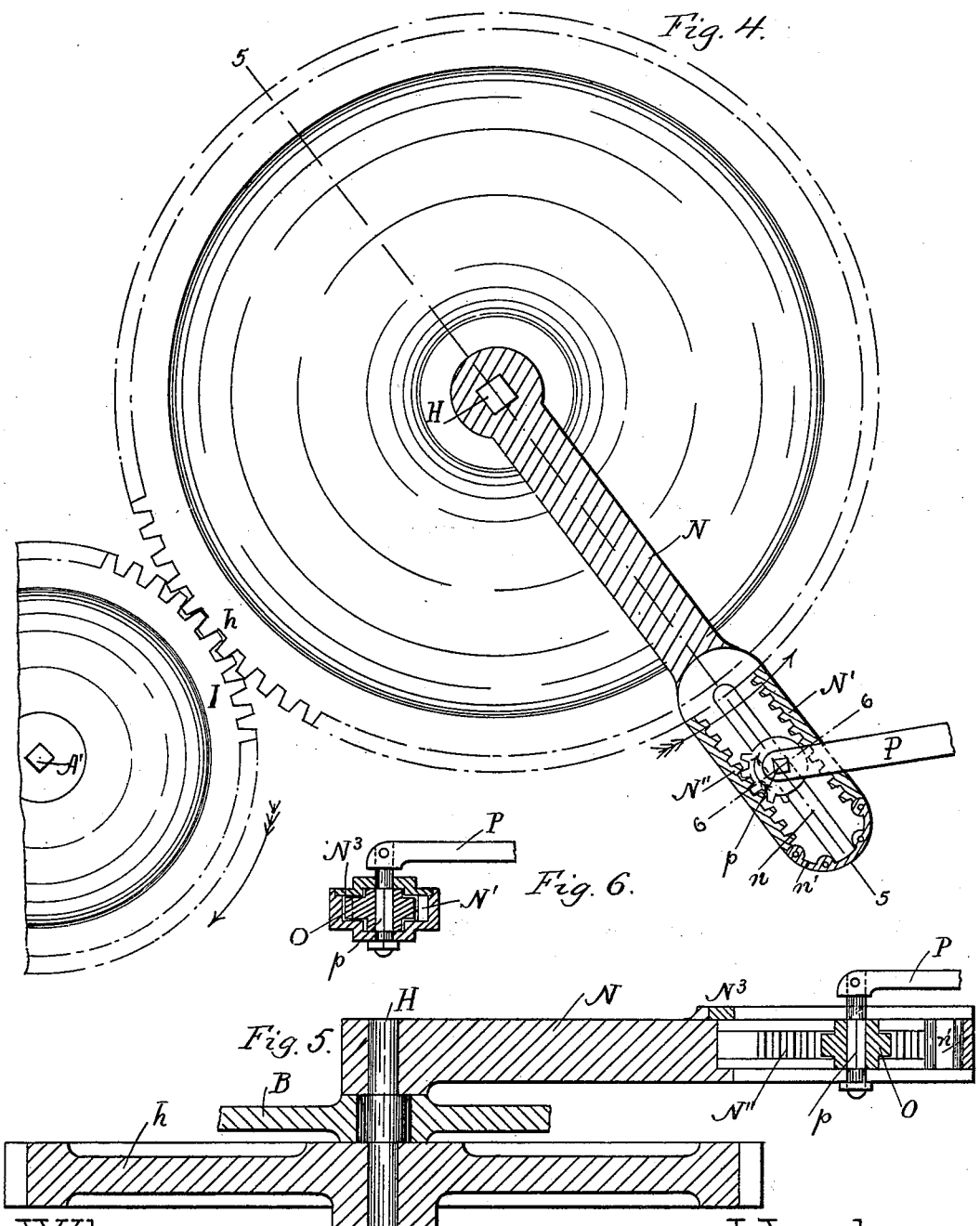

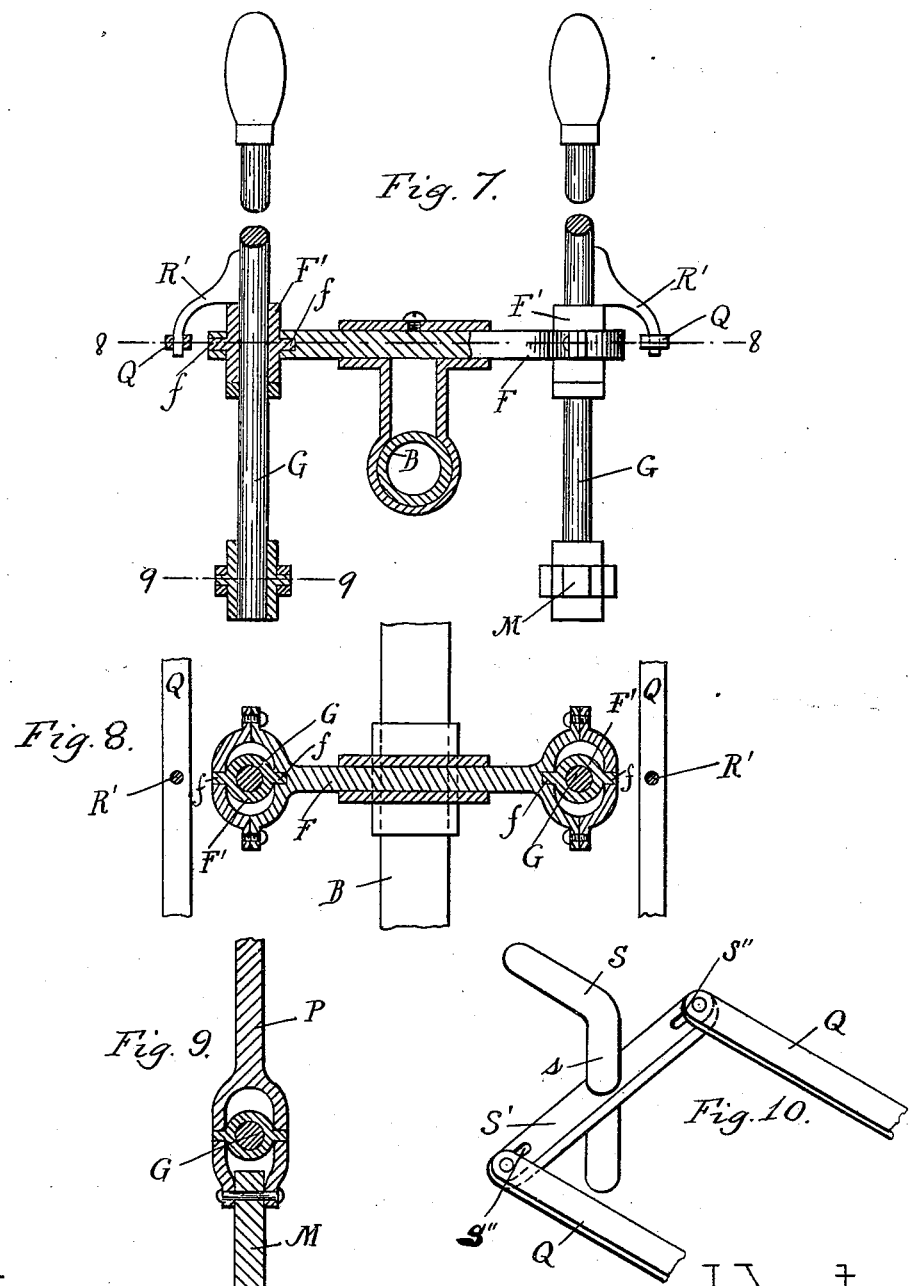

No. 645,144. Patented Mar. 13, 1900.
T. TOLSON.
VELOCIPEDE.
(Application filed Feb. 15, 1899.)
(No Model.) 4 Sheets—Sheet 4.
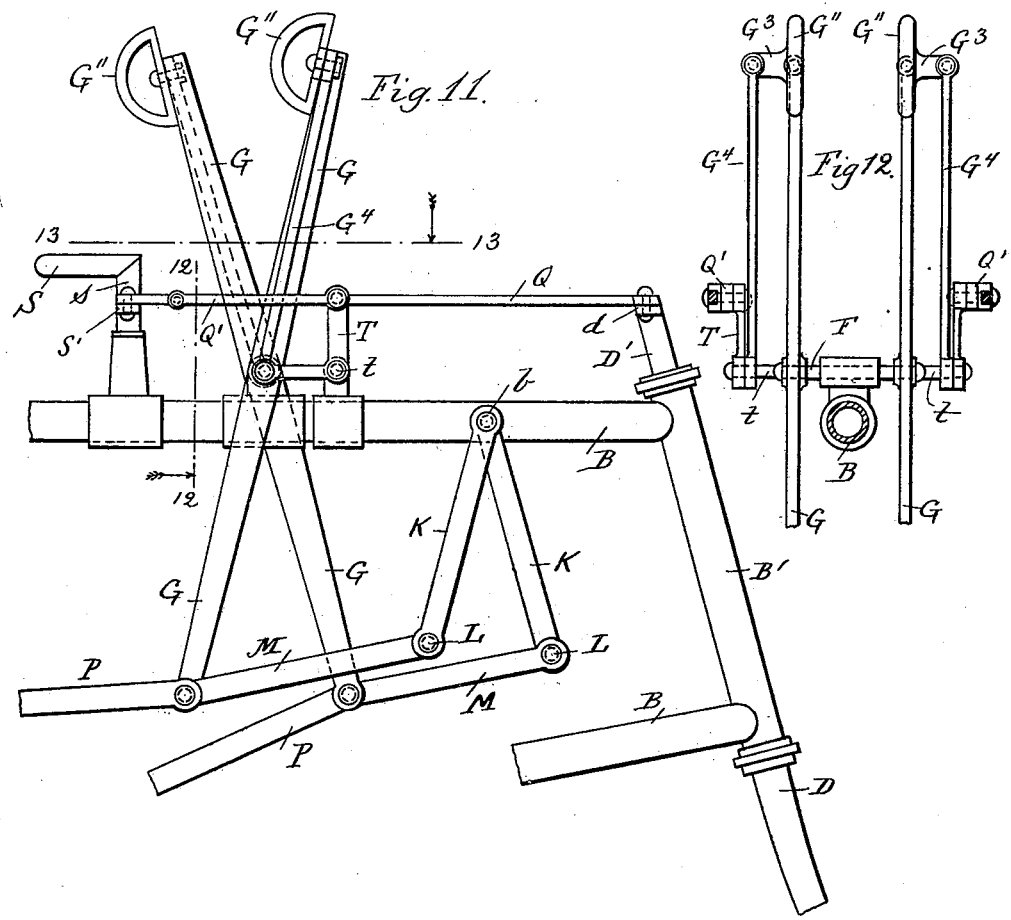
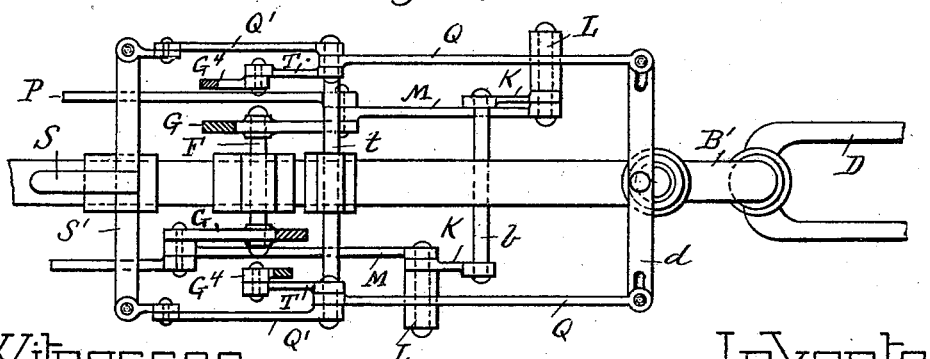
Witnesses. Inventor:
Thomas Tolson.

UNITED STATES PATENT OFFICE.

THOMAS TOLSON, OF BOSTON, MASSACHUSETTS.

VELOCIPEDE.

SPECIFICATION forming part of Letters Patent No. 645,144, dated March 13, 1900.

Application filed February 15, 1899. Serial No. 705,571. (No model.)

*To all whom it may concern:*

Be it known that I, THOMAS TOLSON, a citizen of Great Britain, residing at Boston, in the county of Suffolk and State of Massachusetts, have invented new and useful Improvements in Velocipedes, of which the following is a specification.

This invention relates to improvements in propelling and steering mechanism for bicycles and other velocipedes, and it is carried out as follows, reference being had to the accompanying drawings, wherein—

Figure 1 represents a side elevation of the invention. Fig. 2 represents a cross-section on the line 2 2 shown, in Fig. 1. Fig. 3 represents an enlarged cross-section on the line 3 3, shown in Fig. 1. Fig. 4 represents a detail side elevation of the crank-and-gear driving mechanism, partly shown in section. Fig. 5 represents a cross-section on the line 5 5, shown in Fig. 4. Fig. 6 represents a cross-section on the line 6 6, shown in Figs. 4 and 5. Fig. 7 represents a partial sectional and end view of a modification of the handle-lever propelling device. Fig. 8 represents a horizontal section on the line 8 8 shown in Fig. 7. Fig. 9 represents a horizontal section on the line 9 9, shown in Fig. 7; and Fig. 10 represents a detail perspective view of the auxiliary steering device. Fig. 11 represents a modification of the steering mechanism. Fig. 12 represents a cross-section on the line 12 12, shown in Fig. 11; and Fig. 13 represents a horizontal section on the line 13 13, shown in Fig. 11.

Similar letters refer to similar parts wherever they occur on the different parts of the drawings.

A represents the rear driving-wheel, having its hub journaled on the spindle A', secured to the rear forked portion of the frame B, as usual.

C is the front steering-wheel, the hub of which is journaled on the spindle C', secured to the fork D, having upwardly-projecting spindle D', journaled in the head B' of the frame B, as is common in bicycles and velocipedes.

E is the saddle, adjustably secured to the saddle-post, as usual.

To the frame B is secured a horizontal shaft F, on which are pivoted the hand-levers G G, one on each side of the frame B, as shown in Figs. 1, 2, and 3.

H H are crank-shafts journaled in bearings in the frame B on opposite sides of the driving-wheel A, as shown, each such crank-shaft having secured to it a spur-gear *h*, the teeth of which mesh in pinions I I, secured to opposite ends of the hub of the rear driving-wheel A.

K K are pedal-links pivoted to the frame B at *b* on opposite sides of said frame, as shown.

L L are pedals or stirrups attached to the lower ends of the respective pedal-links K K, as shown.

M M are links or rods pivotally connected to the lower ends of the pedal-links K and hand-levers G, as shown.

To each crank-shaft H is secured a crank N, the crank on one shaft being arranged, preferably, diametrically opposite the other, as shown in Figs. 1 and 2. Each such crank N is longitudinally slotted, as shown at *n* in Figs. 4, 5, and 6, for receiving a pin *p*, secured to or forming part of a link P, the forward end of which is pivoted to the lower end of the hand-lever G, as shown in Figs. 1 and 2. To each pin *p* is secured a partial or mutilated pinion O, having teeth on a portion of its circumference, as shown in Fig. 4, and adapted to intermittently engage with racks N' N'' on the interior portion of the outer end of each crank N, as represented in Fig. 4, for the purpose of automatically varying the lengths of the cranks during their revolution, so as to obtain the most effective leverage thereon for the propulsion of the velocipede with a minimum of motion and pressure on the hand or foot levers. During the revolution of each crank its mutilated pinion is caused to engage intermittently with the internal racks N' N'', first one and then the other, causing the crank to be automatically shortened as it reaches its upper position and automatically lengthened as it reaches its lowest position of the stroke—namely, at or near a right angle to its dead-centers—thus producing the most effective and economical results in the propulsion of the vehicle as compared with the force expended.

In practice I prefer to provide the end of each crank N with a removable cap or end piece *n'*, (shown in Figs. 4 and 5,) which when detached from the crank will permit the insertion or removal of the pinion O.

N³ in Figs. 5 and 6 is a slotted cap-plate secured to the outside of the crank for the purpose of inclosing and protecting the pinion and the racks of the crank.

The device for steering and guiding the velocipede is constructed as follows: On each hand-lever G is loosely journaled a sleeve $g$, and to the upper end of the latter is secured a bevel-gear $g'$, the teeth of which mesh in the teeth of a similar bevel-gear G', journaled on the upper end of the hand-lever G, as shown in Figs. 1 and 3.

G'' is a handle secured to or made integral with the gear G'. On the upper end of the fork-spindle D' is secured a cross-bar $d$, the ends of which are pivotally connected by means of respective links or rods Q Q to projections R R on the lower ends of the sleeves $g$ $g$, as shown in Figs. 1, 2, and 3.

To steer the velocipede during the act of propelling it, the rider, while holding onto the handles G'' G'', needs simply to twist such handles to the right or left more or less, according to the direction in which the velocipede is to be guided. The various bearings of the velocipede and its operative parts may be provided with ball or roller bearings wherever it may be found desirable, so as to operate the moving parts with a minimum of frictional resistance. I also wish to state that although I prefer to use automatically variable or adjustable cranks for actuating the driving-wheel I may, if so desired, make use of cranks of constant radii without departing from the essence of my invention. In so doing the gears $h$ $h$ and pinions I I may be located on the outside of the frame and the links P P connected directly to crank-pins on the outside of the gears $h$ $h$.

In propelling the velocipede the rider while seated on the saddle E places his feet on the pedals or stirrups L L and with his hands he grasps the handles G'' G''. By pushing one pedal L forward and the other one back and simultaneously pushing one hand-lever G forward and pulling the other hand-lever back a powerful rotary motion is imparted to the crank-axles H H and the rear driving-wheel geared to said crank-axles, as hereinbefore set forth and described. In this manner the rider is enabled to use both foot and arm power in propelling the velocipede, thus causing it to be propelled with great force and speed. This crank mechanism may also be used on any velocipede having rotary pedals for the feet instead of the links P P (represented in the drawings) for the purpose of increasing the leverage of the pedals during the downward stroke. In practice I prefer to provide the velocipede with an auxiliary steering device, (represented in Figs. 1, 2, and 10,) and it consists of a spindle $s$, journaled in a bearing on the upper portion of the frame B and provided with a handle or lever S, as shown. To the spindle $s$ is attached or made integral therewith a cross-bar S', the outer ends of which are slotted, as at S'', as most clearly shown in Figs. 2 and 10, in which slotted ends are pivoted the rear ends of the links or rods Q Q.

The handle or lever S is particularly well adapted for use in mounting the velocipede, enabling the rider to hold onto the same preparatory to starting the propulsion of the velocipede. It may also be used in leading the velocipede up hills or whenever the rider desires to dismount and lead the velocipede. It can also to advantage be used to steer the velocipede while riding.

A modification of the hand-lever propelling device is shown in Figs. 7, 8, and 9. It consists in dispensing with the sleeves $g$ on the hand-levers G, as well as the bevel-gears $g'$ G', and providing the upper ends of the levers G with the handles G³. The hand-levers G are journaled in sleeves F', having trunnions $f$ $f$, journaled in bearings in attachments to the stationary shaft $f$, which is secured to the frame B of the velocipede, as shown in Figs. 7 and 8. To each hand-lever G in the said modification is attached a side projection R', pivotally connected to the links or rods Q Q, which are connected in their forward ends to the cross-bar $d$ on the fork-spindle D'. The lower end of each hand-lever G is universally connected in a suitable manner to the links or rods M and P, as shown. From the above it will be seen that by this arrangement in the modification as shown the operator may propel the velocipede by the hand-levers G, in connection with the pedal motion, and during such propulsion he is enabled to guide and steer the velocipede by simply giving a twist to the right or left, as the case may be, on the handles G³ on the upper ends of the said hand-levers G.

In the modification shown in Figs. 11, 12, and 13 the hand-levers G G are pivoted to the frame B on the horizontal spindle F and have their lower ends pivotally connected to the crank-rods P P and pedal-links M M in a manner as hereinabove described. To the upper ends of the levers G G are pivoted the handles G'' G'', which in this modification are provided with side projections G³ G³, which are pivotally connected to links G⁴ G⁴, the lower ends of which are pivoted to bell-crank levers T T, journaled at $t$ $t$ on supports attached to the frame B, as shown in Figs. 11, 12, and 13. The upper ends of the bell-crank levers T T are pivotally connected to the rods or links Q Q, having their forward ends pivotally connected to the cross-bar $d$, secured to the upper end of the fork-spindle D'. It will thus be seen that by rocking or oscillating the handles G'' G'' a rocking motion is imparted to the bell-crank levers T T, and consequently an oscillating steering motion is imparted to the fork-spindle D', the fork D, and the forward wheel journaled therein.

In practice I connect the upper ends of the bell-crank levers T T to the cross-bar S' on the auxiliary steering-handle S by means of links Q' Q', so as to enable the rider to steer the velocipede whenever so desired by manipulating the said handle S, which may be of advantage, particularly when coasting down hills or inclined roads.

What I wish to secure by Letters Patent and claim is—

1. In a velocipede, in combination, a pair of rocking hand-levers G, G sleeves g, g journaled on said levers, bevel-gears, g', g' secured to said sleeves, bevel-gears G', G' journaled on the upper ends of the levers G, G and intermeshing with the gears g', g' and having handles G'', G'' and links Q, Q pivotally connected by means of projections R, R to the sleeves g, g and a projection or lever on the fork-spindle of the forward wheel, substantially as and for the purpose set forth.

2. In a velocipede, the combination of a driving-wheel, a pinion secured thereto, a crank-actuated gear-wheel meshing in said pinion, two pivoted hand-levers, connecting mechanism between said hand-levers and crank gear-wheels, a cross-bar fixed on the steering-fork, sleeves loosely fitted on the upper ends of the hand-levers, intermediate connections between each sleeve and one end of the said cross-bar, and means for turning the sleeve to oscillate the cross-bar, substantially as described and for the purpose specified.

3. In a velocipede, the herein-described driving mechanism, consisting of a driving-wheel, pinions secured thereto, gears meshing with said pinions, cranks secured to said gears and provided with internal racks at their outer ends, mutilated pinions meshing with said racks and movable radially relatively to said gears, link driving mechanism connected to said mutilated pinions, and end caps removably fitted on the ends of said racks to permit the ready insertion and removal of the pinions, substantially as and for the purpose specified.

4. In a velocipede, the combination with two pivoted hand-levers and driving mechanism actuated thereby, of sleeves rotatably fitted on the upper ends of said levers, a cross-bar rigid on the steering-fork, links pivotally connected to the opposite ends of the cross-bar, projections on the sleeves engaging said links, means for turning the sleeves to oscillate the cross-bar, and an auxiliary steering device consisting of a spindle s journaled in the velocipede-frame and having a handle S, and a cross-bar S' rigid on said spindle and slotted at its opposite ends, the rear ends of the said links being pivoted in the slotted ends of the cross-bar S', substantially as described and for the purpose specified.

In testimony whereof I have hereunto set my hand in presence of two subscribing witnesses.

THOMAS TOLSON.

Witnesses:
ALBAN ANDRÉN,
KARL A. ANDRÉN.